(12) United States Patent
Nakkiran (10) Patent No.: US 10,354,096 B2
(45) Date of Patent: *Jul. 16, 2019

(54) AUTOMATED MANUFACTURING SYSTEM WITH ADAPTER SECURITY MECHANISM AND METHOD OF MANUFACTURE THEREOF

(71) Applicant: Data I/O Corporation, Redmond, WA (US)

(72) Inventor: Raj Nakkiran, Redmond, WA (US)

(73) Assignee: Data I/O Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/871,967

(22) Filed: Jan. 15, 2018

(65) Prior Publication Data

US 2018/0157866 A1  Jun. 7, 2018

Related U.S. Application Data

(63) Continuation of application No. 14/921,833, filed on Oct. 23, 2015, now Pat. No. 9,870,487.

(60) Provisional application No. 62/098,257, filed on Dec. 30, 2014.

(51) Int. Cl.
*H04L 9/08* (2006.01)
*H04L 9/32* (2006.01)
*G06F 21/72* (2013.01)

(52) U.S. Cl.
CPC ............ *G06F 21/72* (2013.01); *H04L 9/3242* (2013.01); *H04L 9/3271* (2013.01); *H04L 9/0897* (2013.01)

(58) Field of Classification Search
None
See application file for complete search history.

(56) References Cited

U.S. PATENT DOCUMENTS

| 5,557,679 | A  | 9/1996  | Julin et al.    |
|-----------|----|---------|-----------------|
| 6,657,426 | B1 | 12/2003 | Powell et al.   |
| 7,818,075 | B2 | 10/2010 | Johnson et al.  |
| 8,028,100 | B2 | 9/2011  | Bolotin et al.  |
| 8,271,783 | B2 | 9/2012  | Ibrahim et al.  |

(Continued)

FOREIGN PATENT DOCUMENTS

WO    WO2014/155363    10/2014

OTHER PUBLICATIONS

Weis et al., "Security and Privacy Aspects of Low-Cost Radio Frequency Identification Systems", Security in Pervasive Computing, pp. 201-212, Jan. 27, 2004.

(Continued)

*Primary Examiner* — Christopher A Revak
(74) *Attorney, Agent, or Firm* — Wong & Rees LLP (57) ABSTRACT

A method of operation of an automated assembly system includes: detecting a socket adapter having an adapter identifier and an adapter cryptographic chip; calculating a primary key hash based on a primary key in a programming cryptographic chip; calculating an adapter hash based on the adapter identifier using the adapter cryptographic chip; matching the primary key hash to the adapter hash to update an authentication token with the adapter identifier for authenticating the socket adapter on the device programming system; and programming programmable devices in the socket adapter based on the authentication token.

20 Claims, 6 Drawing Sheets

(56) References Cited

U.S. PATENT DOCUMENTS

| | | |
|---|---|---|
| 9,870,487 B2 | 1/2018 | Nakkiran |
| 2004/0093507 A1 | 5/2004 | Courcambeck et al. |
| 2004/0105447 A1 | 6/2004 | Lee |
| 2005/0257063 A1* | 11/2005 | Hamano ................ G06F 21/57 |
| | | 713/176 |
| 2007/0095927 A1 | 5/2007 | Pesonen |
| 2007/0276682 A1 | 11/2007 | Bolotin et al. |
| 2011/0091040 A1 | 4/2011 | Krysiak et al. |
| 2011/0099384 A1 | 4/2011 | Grange et al. |
| 2013/0318638 A1* | 11/2013 | Galka .................... G06F 21/10 |
| | | 726/34 |
| 2014/0014714 A1 | 1/2014 | Tang |
| 2014/0016776 A1* | 1/2014 | Van Foreest ........... G06F 21/72 |
| | | 380/46 |
| 2014/0298040 A1 | 10/2014 | Ignatchenko et al. |
| 2016/0188910 A1 | 6/2016 | Rnakkiran |

OTHER PUBLICATIONS

European Patent Office, Application No. 15876198.1, Extended European Search Report dated Dec. 8, 2017.
European Patent Office, Application No. 15876198.1, Pending Claims as of Dec. 8, 2017.
European Patent Office, Application No. 15876198.1, Foreign Office Action dated Feb. 11, 2019.
Menezes et al., "Handbook of Applied Cryptography", [CRC Press Series on Discreet Mathematices and Its Applications], CRC Press, Boca Raton, FL, US, pp. 385-424, Oct. 1, 1996.

\* cited by examiner

AUTOMATED MANUFACTURING SYSTEM WITH ADAPTER SECURITY MECHANISM AND METHOD OF MANUFACTURE THEREOF

CROSS-REFERENCE TO RELATED APPLICATION(S)

This application claims benefit as a Continuation of U.S. application Ser. No. 14/921,833, filed Oct. 23, 2015, which claims the benefit of U.S. Provisional Patent Application Ser. No. 62/098,257 filed Dec. 30, 2014, the entire contents of the aforementioned are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates generally to automated systems, and more particularly to automated manufacturing systems with adapter security mechanism for manufacturing operations.

BACKGROUND ART

Most of the world's electronic manufacturers do not possess the ability to build highly proficient multi-module automated processing systems, such as a manufacturing system that contain fully integrated robotics systems. There is a desire to standardize manufacturing processes across multiple manufacturing sites world-wide. In order to reduce development costs some manufacturers have reverse engineered manufacturing devices.

The risks of exposure or proprietary manufacturing processes and client intellectual property can restrict product manufacturing to dedicated sites utilizing certified assembly devices. This can restrict the available volumes of products without regard to potential increased demand and dwindling supplies.

Some manufacturing capacity can be underutilized because the required processes and intellectual property cannot be transferred to additional sites. The exposure or loss of the manufacturing process or the client intellectual property is too great for unsecured movement between manufacturing facilities. Compromise of the manufacturing process or the client's intellectual property can represent a business calamity that could ruin the manufacturer's reputation and risk future business opportunity.

Thus, a need still remains for an automated manufacturing system with adapter security that can effectively protect the manufacturing process and the client's intellectual property, while being able to distribute the workload across multiple sites as required to meet the client's manufacturing needs. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The embodiments of the present invention provides a method of operation of an automated assembly system including: detecting a socket adapter having an adapter identifier and an adapter cryptographic chip; calculating a primary key hash based on a primary key in a programming cryptographic chip; calculating an adapter hash based on the adapter identifier using the adapter cryptographic chip; matching the primary key hash to the adapter hash to update an authentication token with the adapter identifier for authenticating the socket adapter on the device programming system; and programming programmable devices in the socket adapter based on the authentication token.

The embodiments of the present invention provides an automated manufacturing system, which includes: a socket adapter having an adapter identifier; a programming cryptographic chip, coupled to the socket adapter, for calculating a primary key hash based on a primary key; an adapter cryptographic chip, coupled to the socket adapter, for calculating an adapter hash based on the adapter identifier; and a programming processor, coupled to the programming cryptographic chip, for matching the primary key hash to the adapter hash to update an authentication token with the adapter identifier for authenticating the socket adapter to enable programming programmable devices in the socket adapter based on the authentication token.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention, and it is to be understood that other embodiments would be evident based on the present disclosure and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations, and process steps are not disclosed in detail. Likewise, the drawings showing embodiments of the invention are semi-diagrammatic and not to scale and, particularly, some of the dimensions are for the clarity of presentation and are shown exaggerated in the drawing FIG's. In addition, where multiple embodiments are disclosed and described having some features in common, for clarity and ease of illustration, description, and comprehension thereof, similar and like features one to another will ordinarily be described with like reference numerals.

The term "horizontal" as used herein is defined as a plane parallel to the plane or surface of the operating plane of an automated assembly system, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

Figure 1:
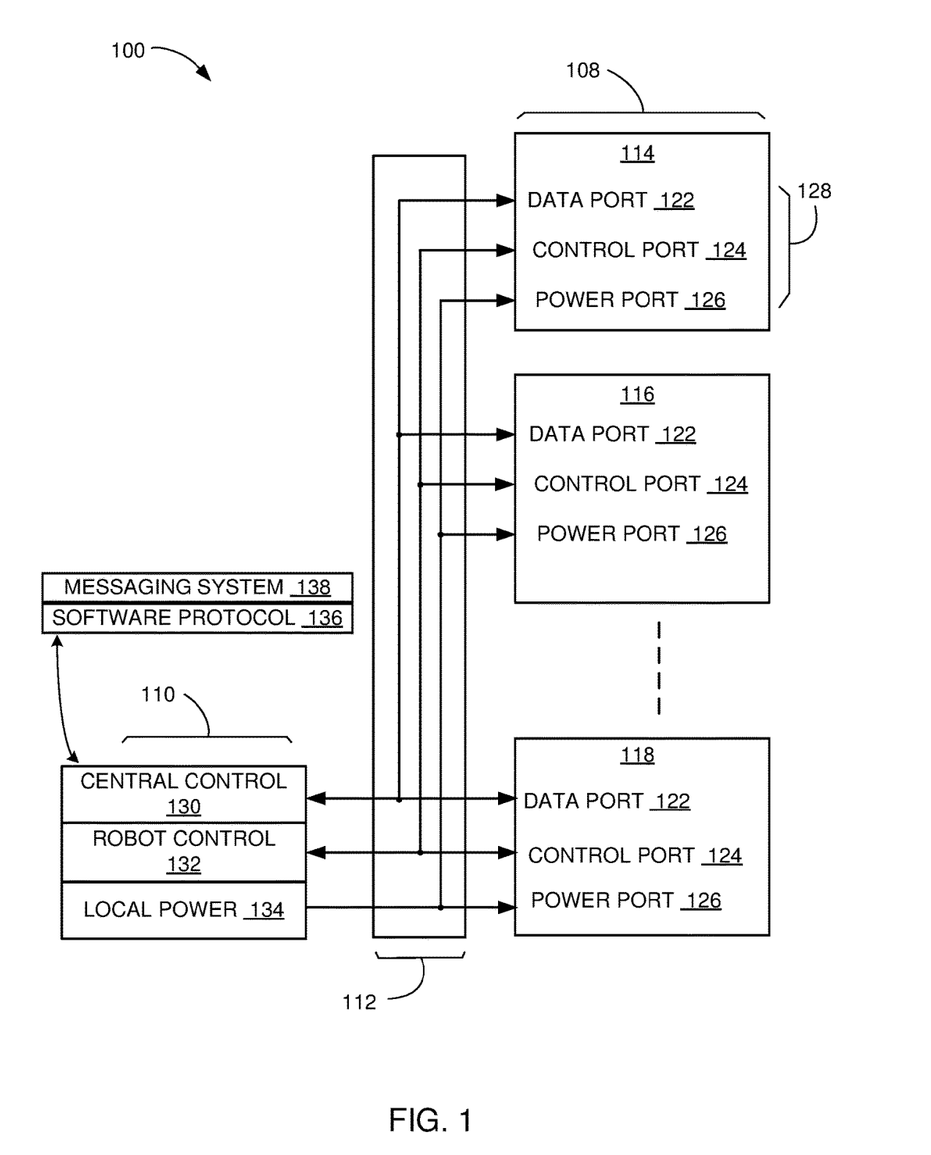
FIG. 1 is a functional block diagram of an automated assembly system in accordance with an embodiment of the present invention.

Referring now to FIG. 1, therein is shown a functional block diagram of an automated assembly system 100 in accordance with an embodiment of the present invention. The automated assembly system 100 is a mechanism for configuring programmable devices. The automated assembly system 100 can include a system controller 110 and one or more assembly devices 108.

The automated assembly system 100 can be configured to accept modules with an intelligent design. These intelligently designed modules are configured to interface with the automated assembly system 100. The automated assembly system 100, can be an automated programming system, can immediately recognizes module information such as the identification of the module, the type of module, the configuration of the module, the geometry of the module, and the location of the module within the system or feeder bank. For example, configuration information about the assembly devices that, can be programming modules, provide socket count, socket pitch, socket offset, socket location, and the number of programming sites. On the other hand, an intelligently designed tape module may simply provide information about the pocket offset.

The automated assembly system 100 can include a backplane 112, a first intelligent module 114, a second intelligent module 116, an Nth intelligent module 118, and the system controller 110. The backplane provides a data, control, and power, communication interface for the smart interface system.

For example, the backplane may provide a transmission interface for the first intelligent module, the second intelligent module, and the $N^{th}$ intelligent module, wherein the $N^{th}$ intelligent module represents any module number greater than one. It is understood that the automated assembly system 100 can include any number of the intelligent modules and each of the intelligent modules can control the assembly devices 108.

Each of the modules contains a data port 122, a control port 124, and a power port 126. The control port 124 can be used to transmit commands to and status between the modules. For example, track identification information, such as the physical location of each module, can be transferred through the control port 124.

The data port 122 can be used to broadcast device image data, send commands, and receive status information for programming operations. Due to the volume of data transmitted by the data port 122, a high-speed port, such as an Ethernet connection is usually employed. Any module that would require the transmission of large amounts of data could use the data port 122.

The power port 126 transmits power to each module through the backplane. The power supplied to each module via the power port 126 can be electrical, but in principle, it could be mechanical, pneumatic, hydraulic, magnetic, optical, chemical, or a combination thereof.

The data port 122, the control port 124, and the power port 126 are collectively referred to as a composite connection 128. As the composite connection 128 may protrude from the module, a mechanical protection scheme can be designed to protect it from accidental damage.

The composite connection 128 may also employ a hardware based naming format. This format will allow configurable hardware switches on each module that not only differentiate by the type of module, but also by a module serial number of each module.

The composite connection 128, when coupled to the smart interface system, may employ a mechanical fit connection that consists of pins and spring-loaded washers. Each module may use an identical set pitch for the composite connection 128 pins. This type of configuration provides for uniform mounting and consistent registration for each of the composite connection 128. Additionally, the pin and spring loaded washer type of connection establishes a reliable and repeatable tool-less installation that requires minimal time. Each module can be installed by merely establishing preliminary contact and then registering or locking in place.

The data port 122, the control port 124 and the power port 126 of each one of the modules is coupled with a central control 130, a robot control 132, and a local power 134, respectively, within the system controller 110. The system controller 110 acts as a processing component for receiving and transmitting information between the non-text user interface system and each of the modules.

Each of the control port 124 includes a track information system for communicating track identification information with the backplane. The track identification information may include a unique identification number and a unique location designation. For example, the first intelligent module, the second intelligent module, and the $N^{th}$ intelligent module each possess the ability to transmit track information.

A software protocol 136 that delivers information through the data port 122 and the control port 124 is a bi-directional protocol. For example, the data port 122 can use an Ethernet port and the control port 124 can use a Controller Area Network (CAN) port with a hard coded segment for carrying track identification information. This bi-directional protocol allows for data and controls (digital and analog) communication. Each module may use this common protocol to enhance interchangeability within the system.

The software protocol 136 can also employ a multiple master system, which allows any component within the automated manufacturing system to request or send data. For example, the input module could request data from one of the programming modules without any need for the robot control 132 within the system controller 110 to initiate a transverse request. The software protocol 136 also includes a messaging system 138, which can relay information between components. For example, the messaging system 138 can relay information about whether or not the adapters are open or closed, and what type of modules are installed within the system.

The messaging system 138 may include a prioritized messaging system, wherein both of these systems are based on the Controller Area Network (CAN) protocol. The present invention employs a unique set of CAN messages. All messages within the CAN system are based on a message number, with lower numbered messages receiving the higher priority. So, if two messages are sent simultaneously, the message with the lowest value will get through, and the other message will have to wait to be retransmitted at a later date.

Any cryptographic solution involves a secret key, such as a primary key or a root key. The biggest issue with keys is how to keep them as a secret. Usually software embeds the key in some obscure needle in the hay stack model. Using today's supercomputers, these are easily breakable.

The current system insures no one ever knows the primary key. It is never kept in any software. No one really knows the key, not even the developers who coded the software. The key is kept in hardware and could never be read out. It can only be used internally to an integrated circuit for cryptographic operations.

Figure 2:
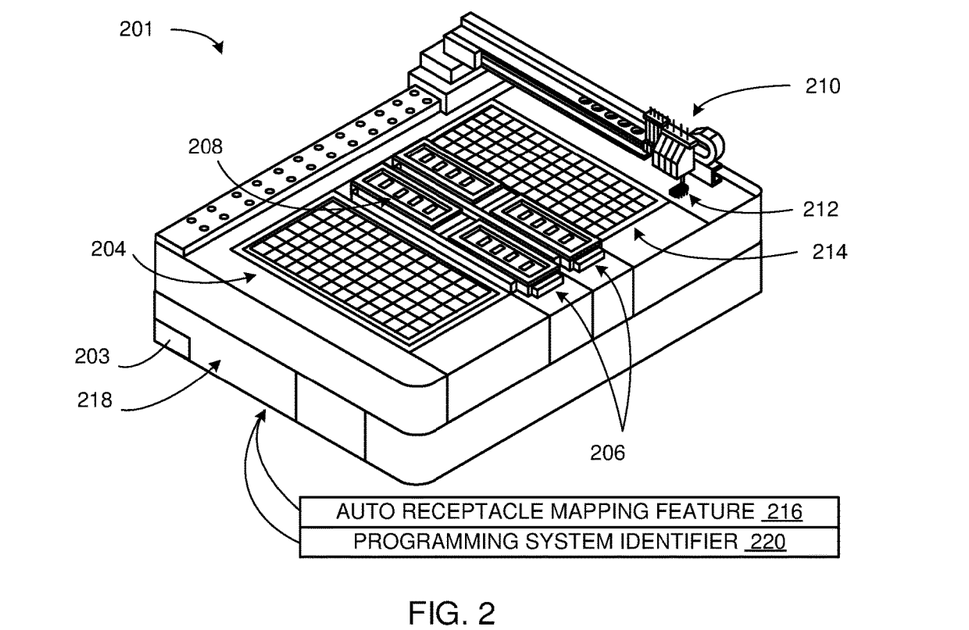
FIG. 2 is an isometric view of a device programming system.

Referring now to FIG. 2, therein is shown an isometric view of a device programming system 201. The device programming system 201 can include a programming processor 218, an input device receptacle 204, socket adapters 206, destination sockets 208, a device placement unit 210, programmable devices 212, and an output device receptacle 214. The device programming system 201 can be the automated assembly system 100 of FIG. 1.

The automated assembly system 100 is a mechanism for configuring programmable devices 212. The automated assembly system 100 can configure the programmable devices 212 by initializing and writing a data image into the programmable devices 212. The programmable devices 212 can include Flash memory devices, programmable read-only memory, hybrid devices having processing and memory elements, or a combination thereof.

The automated assembly system 100 can include the system controller 110 of FIG. 1 and one or more of the assembly devices 108 of FIG. 1. Each of the assembly devices 108 can configure and program one or more of the programmable devices 212.

The device programming system 201 is a device for configuring the programmable devices 212. The device programming system 201 can load an entire chip image at a time and then configure the programmable devices 212. Configuring is defined as writing control and data information to the programmable devices 212. Configuring the programmable devices 212 can store memory structure, cryptographic data, and user data on the programmable devices 212. Configuring can include forming one-time structures such as partitions on the programmable devices 212.

The device programming system 201 can include the programming processor 218. The programming processor 218 is a computing unit for controlling the device programming system 201. The programming processor 218 can include a central processing unit (not shown), a local storage unit 203, a communication interface (not shown), and a software (not shown).

The programming processor 218 can have a variety of configurations. For example, the programming processor 218 can include the system controller 110 or be coupled to the system controller 110. The programming processor 218 can be a single processor, a multiprocessor, a cloud computing element, or a combination thereof.

The local storage unit 203 is a device for storing and retrieving information. For example, the local storage unit 203 of the device programming system 201 can be a disk drive, a solid-state memory, an optical storage device, or a combination thereof. The software is control information for executing on the control unit. The software can be used to control the functionality of the device programming system 201.

The device programming system 201 can include the input device receptacle 204 and the output device receptacle 214. The input device receptacle 204 is a source of the programmable devices 212. For example, the input device receptacle 204 can be a tray that conforms to the Joint Electron Device Engineering Council (JEDEC) standards. The input device receptacle 204 can be used for holding unprogrammed devices. The output device receptacle 214 is a destination for the programmable devices 212 that have been processed. For example, the output device receptacle 214 can be an empty JEDEC tray for holding finished devices.

The device programming system 201 can include the socket adapters 206 having the destination sockets 208. The socket adapters 206 are mechanisms for holding and managing sockets. The sockets are mechanisms for holding and interfacing with the programmable devices 212.

The socket adapters 206 are modular and can be removed from the device programming system 201 to accommodate different socket configurations. For example, the socket adapters 206 can include a latch mechanism (not shown) for attaching to the device programming system 201.

The socket adapters 206 are secure devices that can authenticate themselves with the device programming system 201 using a cryptographic challenge process to allow access to the socket adapters 206. The socket adapters 206 are described in greater detail below.

The destination sockets 208 can hold the programmable devices 212. In general, the destination sockets 208 can be used to read or write new information to one of the programmable devices 212.

The device programming system 201 can include the device placement unit 210. The device placement unit 210 is a mechanism for positioning a programmable device in one of the destination sockets 208.

The device placement unit 210 can be implemented in a variety of ways. For example, the device placement unit 210 can be a robotic arm, a pick and place mechanism, or a combination thereof. Although the device placement unit 210 is described as a rail-based positioning system, it is understood that any system capable of positioning one of the programmable devices 212 in the destination sockets 208 can be used.

The device placement unit 210 can retrieve one or more of the programmable devices 212 that are blank from the input device receptacle 204. The device placement unit 210 can transport the programmable devices 212 to the destination sockets 208 of the socket adapters 206.

Once the programmable devices 212 are engaged and secured by the socket adapters 206, the device programming process can begin. The device programming system 201 can program a local copy of the information into the programmable devices 212 in one of the destination sockets 208. For example, the local copy of the programming information can be in a pre-programmed master device, from a file in local storage, or from a remote server.

Once programming is complete, the device placement unit 210 can transport the programmable devices 212 that have been programmed to the output device receptacle 214. The device placement unit 210 can transports any of the programmable devices 212 that have errors to a reject bin (not shown).

The automated assembly system 100 can include an automatic receptacle mapping feature 216. The automatic receptacle mapping feature 216 will automatically measure the physical characteristics and connector geometry of the programmable devices, such as the number of rows and columns, the row offset and pitch, and the column offset and pitch. These automatic measurements provide information about the exact coordinates, for example X, Y, Z, and theta directions or sometimes only X and Y directions for each center of pocket within each receptacle. This can include the location for each device.

The automatic receptacle mapping feature 216 employs optical methods based upon, changes of state, such as reflectivity, and specifically designed algorithms to calculate receptacle location, geometry and physical characteristics. This mapping feature is designed in such a way that the operator no longer has to manually enter in the physical characteristics and geometry of the programmable device and the destination sockets 208, which saves the operator time and prevents operator input error.

The automated assembly system 100 can include a programming system identifier 220. The programming system identifier 220 is a unique value for each particular one the device programming system 201. The programming system identifier 220 can be used to uniquely identify each one of the device programming system 201.

Figure 3:
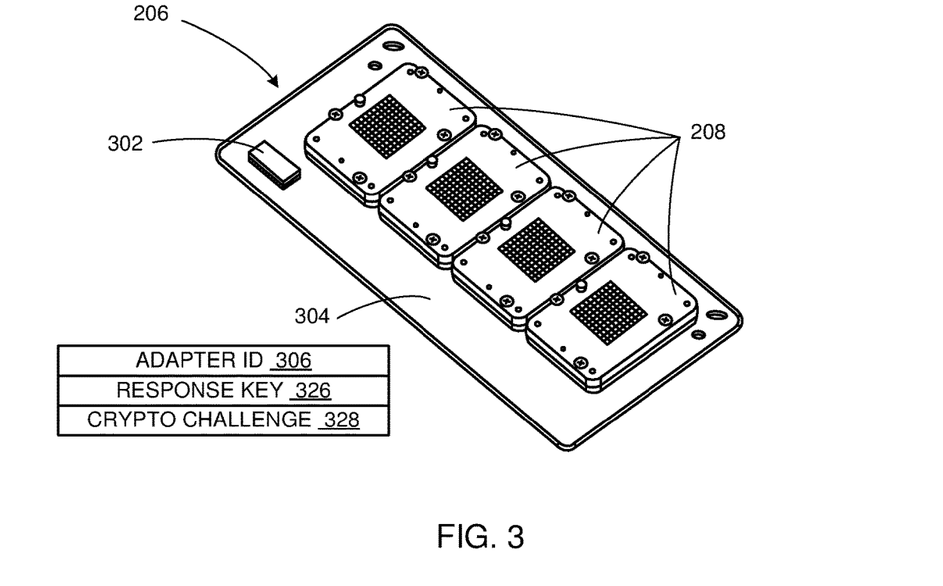
FIG. 3 is an isometric view of one of the socket adapters.

Referring now to FIG. 3, therein is shown an isometric view of one of the socket adapters 206. The socket adapters 206 can include an adapter cryptographic chip 302, an adapter base 304, and one or more of the destination sockets 208 for retaining the programmable devices 212 of FIG. 2.

Each of the socket adapters 206 can include an adapter identifier 306. The adapter identifier 306 is a unique number associated with each one of the socket adapters 206. For example, the adapter identifier 306 can be a serial number, a part number, a random number, a calculated cryptographic key, or a combination thereof.

The adapter cryptographic chip 302 is an electronic component for performing crypto-authentication. The adapter cryptographic chip 302 can respond to a cryptographic challenge 328 by calculating a response key 326. The response key 326 can be based on the adapter identifier 306 of one of the socket adapters 206. The cryptographic challenge 328 is described in greater detail below.

For example, the adapter cryptographic chip 302 can be from the Atmel family of crypto-authentication chips including the ATAES132A, the ATECC108A, the ATSHA204A, or the ATECC508A. The adapter cryptographic chip 302 can implement a variety of security models including the Advanced Encryption Standard (AES), Elliptical curve cryptography (ECC), Elliptic Curve Diffie-Hellman (ECDH), or a combination thereof.

The socket adapters 206 can have a variety of configuration. For example, the socket adapters 206 can include four of the destination sockets 208 for configuring the programmable devices 212. Although the socket adapters 206 are shown with four sockets, it is understood that the socket adapters 206 any number and combination of the destination sockets 208.

The destination sockets 208 can be used for reading and writing the programmable devices 212. The destination sockets 208 can be used to read from a pre-programmed device. The destination sockets 208 are only used to configure the programmable devices 212 that are blank or unprogrammed.

The destination sockets 208 of the socket adapters 206 can be coupled to the device programming system 201 of FIG. 2 with contacts (not shown) on the top and bottom of the socket adapters 206. The device programming system 201 can access to the adapter cryptographic chip 302 via the contacts for authentication of the socket adapters 206.

Figure 4:
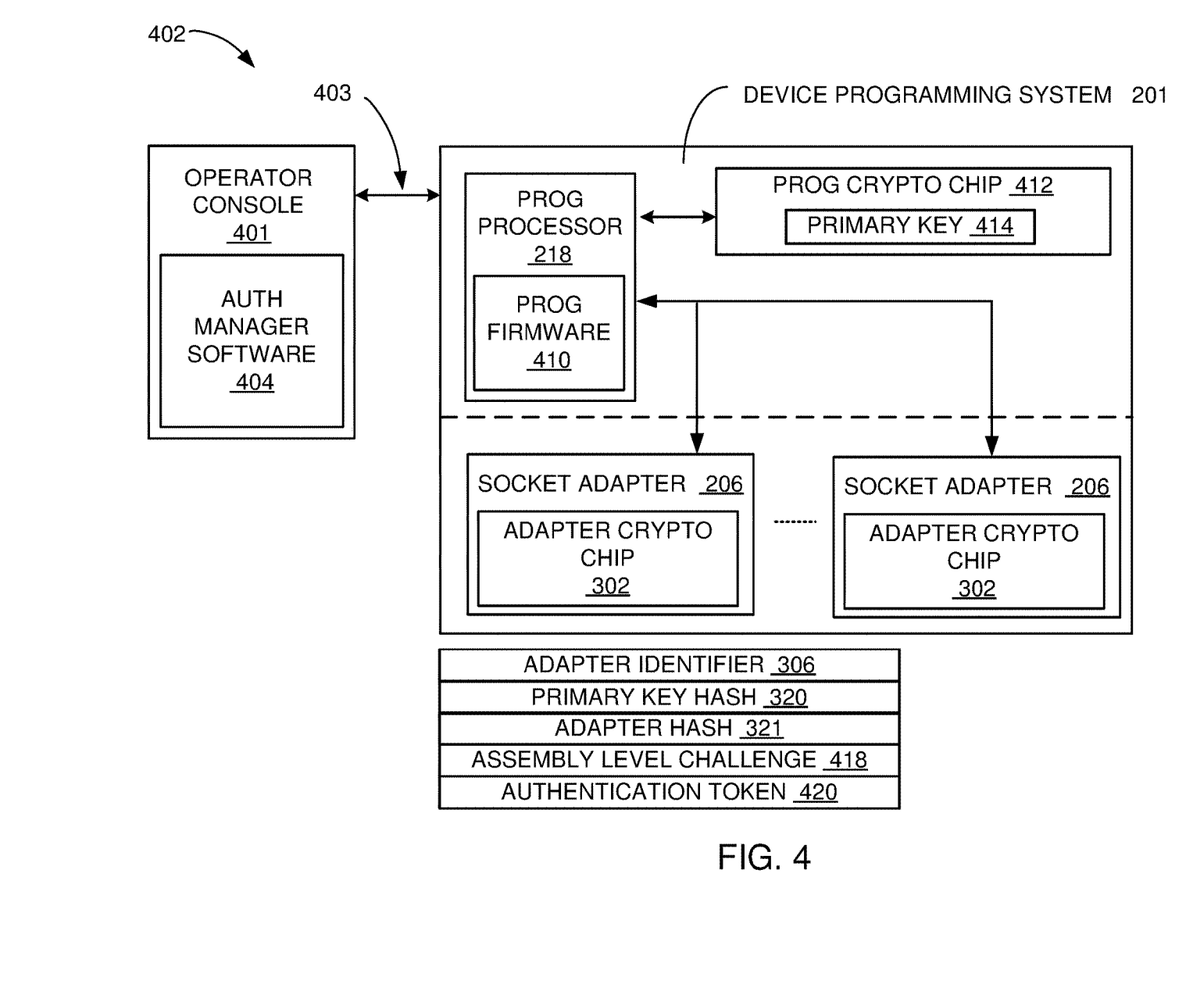
FIG. 4 is a functional block diagram of an adapter security system.

Referring now to FIG. 4, therein is shown a functional block diagram of an adapter security system 402. The functional block diagram depicts an operator console 401 having an authentication manager software 404 coupled to the automated assembly system 100 of FIG. 1 over a secure network 403. The automated assembly system 100 of FIG. 1 can include the device programming system 201 of having one or more of the socket adapters 206.

The automated assembly system 100 can include the device programming system 201 having one or more of the socket adapters 206. The device programming system 201 can include a programming processor 218 running a programming firmware 410. The programming processor 218 is coupled to a cryptographic chip, such as a programming cryptographic chip 412.

For example, the cryptographic chip can be from the Atmel family of crypto-authentication chips including the ATAES132A, the ATECC108A, the ATSHA204A, or the ATECC508A. The cryptographic chip can implement a variety of security models including the Advanced Encryption Standard (AES), Elliptical curve cryptography (ECC), Elliptic Curve Diffie-Hellman (ECDH), or a combination thereof.

The programming cryptographic chip 412 can include an internal copy of a primary key 414. The primary key 414 can be a master trusted root key or other unique cryptographic key. The primary key 414 is a unique value associated with the automated assembly system 100 that can be used to validate the trust relationship between entities. The primary key 414 is described in greater detail below.

The programming cryptographic chip 412 can be provisioned and assigned the primary key 414 in an initialization process. Once the programming cryptographic chip 412 has been configured with the primary key 414, the primary key 414 is stored in an area of internal memory that cannot be accessed from outside the programming cryptographic chip 412. The primary key 414 is a unique identifier to identify the individual automated assembly system 100. Each one of the individual automated assembly system 100 can have a unique value for the primary key 414.

The automated assembly system 100 can be deployed in a facility controlled by a client. The automated assembly system 100 can be used to configure programmable devices installed in the socket adapters 206. However, the automated assembly system 100 will authenticate each of the socket adapters 206 by indirectly comparing the value of the primary key 414 with the value of the adapter identifier 306.

The automated assembly system 100 can authenticate the socket adapters 206 using an assembly level challenge 418. In the assembly level challenge 418, the adapter security system 402 can authenticate each of the socket adapters 206 by comparing a primary key hash 320 with an adapter hash 321. The programming cryptographic chip 412 can calculate the primary key hash 320 and the adapter cryptographic chip 302 of FIG. 3 can calculate the adapter hash 321. The two hash values are compared and one of the socket adapters 206 is authenticated if the two hash values match.

The primary key hash 320 is a calculated value based on the primary key 414 and the adapter identifier 306 of the socket adapters 206. The primary key 414 remains securely stored internally within the programming cryptographic chip 412 and cannot be directly accessed from outside any of the programming cryptographic chip 412. The primary key hash 320 can be calculated by the programming cryptographic chip 412 by submitting the adapter identifier 306 of one of the socket adapters 206 to the programming cryptographic chip 412. The primary key hash 320 is internally calculated by the programming cryptographic chip 412 and is based on the primary key 414 and the adapter identifier 306. The adapter identifier 306 can be retrieved from the socket adapters 206.

The adapter security system 402 can calculate the adapter hash 321 by interrogating the adapter cryptographic chip 302 of one of the socket adapters 206. Each of the socket adapters 206 can include an internal copy of the primary key 414 stored within the adapter cryptographic chip 302. The programming firmware 410 can send a command or the cryptographic challenge 328 of FIG. 3 to the socket adapters 206 instructing the adapter cryptographic chip 302 to calculate the adapter hash 321. The adapter hash 321 is based on the internally stored copy of the primary key 414 in the adapter cryptographic chip 302 and the adapter identifier 306.

The programming processor 218 running the programming firmware 410 can compare the primary key hash 320 and the adapter hash 321 and if the values match, then the selected one of the socket adapters 206 is authenticated. When one of the socket adapters 206 has been authenticated, then the adapter security system 402 can enable one of the socket adapters 206 for operation. If one of the socket adapters 206 is unauthenticated, then the adapter security system 402 can prevent the use of the one of the socket adapters 206 that has failed authentication.

The programming processor 218 can execute the programming firmware 410 to request the calculation of the primary key hash 320 by the programming cryptographic chip 412 and request the calculation of the adapter hash 321 based on the adapter identifier 306. The programming processor 218 can then compare the primary key 414 and the adapter hash 321 to authenticate the socket adapters 206. If the hashes match, then the automated assembly system 100 can program the programmable devices 212 of FIG. 2 coupled to the socket adapters 206. By only comparing the primary key hash 320 and the adapter hash 321, the primary key 414 can remained hidden and is not exposed outside the cryptographic chips.

Authentication of the socket adapter 206 allows the socket adapter 206 to be used by the device programming system 201. For example, matching the primary key hash 320 to the adapter hash 321 can set an authentication token 420 to the value of the adapter identifier 306 to indicate that the selected one of the socket adapters 206 is authenticated. The authentication token 420 can be a single value, a list, a matrix, a hybrid data structure, or a combination thereof.

In an illustrative example, the device programming system 201 can detect the socket adapter 206 that is unauthorized if the adapter identifier 306 is not referenced in the authentication token 420. If the one of the socket adapters 206 is unauthorized, then the device programming system 201 can prevent access to the indicated one of the socket adapters 206.

It has been discovered that authenticating one of the socket adapters 206 by calculating the primary key hash 320 and the adapter hash 321 increases security by insuring that the socket adapters 206 are authorized to operate within the device programming system 201. By verifying that the same value of the primary key 414 is in each of the cryptographic chips, secure operation can be provided.

Figure 5:
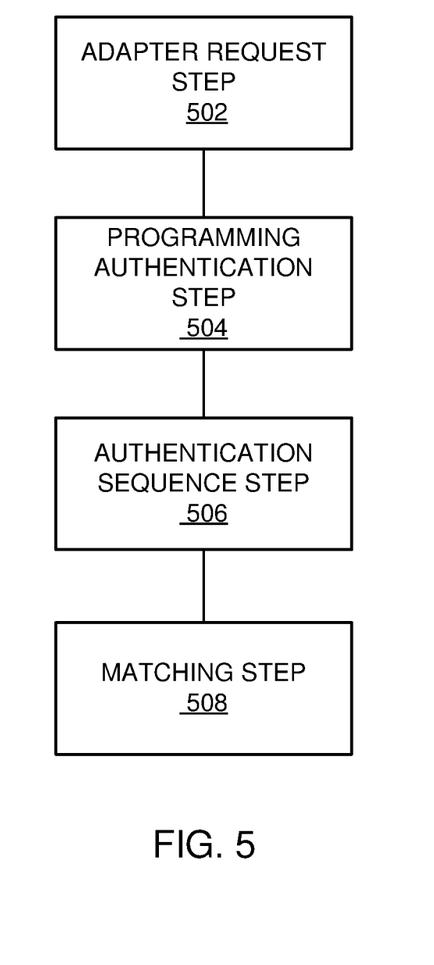
FIG. 5 is an exemplary process flow of the operation of the adapter security system.

Referring now to FIG. 5, therein is shown an exemplary process flow of the operation of the adapter security system 402 of FIG. 4. The adapter security system 402 can authenticate the socket adapters 206 of FIG. 2 by comparing the primary key hash 320 of FIG. 3 and the adapter hash 321 of FIG. 3 for each of the socket adapters 206.

In an illustrative example, the operator console 401 of FIG. 4 can send a request to the automated assembly system 100 of FIG. 1 to authenticate the socket adapters 206. An authentication process for the socket adapters 206 at customer manufacturing site can be as follows:

In an adapter request step 502, the authentication manager software 404 of FIG. 4 in the operator console 401 can request the programming firmware 410 of FIG. 4 in the programming processor 218 to authenticate one of the socket adapters 206 that has been newly inserted.

In a programming authentication step 504, the programming firmware 410 requests the programming cryptographic chip 412 of FIG. 4 on the system controller 110 of FIG. 1 to authenticate the socket adapters 206 with the cryptographic challenge 328 of FIG. 3.

In an authentication sequence step 506, the programming cryptographic chip 412, which has the primary key 414 of FIG. 4 internally, starts the cryptographic challenge 328. The cryptographic challenge 328 is an answer and response protocol used for authentication. For example, the actions of the authentication sequence step 506 can be as follows:

1. The device programming system 201 of FIG. 2 can interrogate the socket adapters 206 to get the adapter identifier 306 of FIG. 3 from one of the socket adapters 206.
2. The programming processor 218 of FIG. 2 and the programming cryptographic chip 412 can generate the assembly level challenge 418 of FIG. 4 and send it to the socket adapters 206.
3. Each of the socket adapters 206 combines the adapter identifier 306, the internal copy of the primary key 414 on-board the adapter cryptographic chip 302 of FIG. 3, and the assembly level challenge 418 received and computes the adapter hash 321.
4. The socket adapters 206 return the challenge response 322 of FIG. 3 to the programming cryptographic chip 412 in the system controller 110. The challenge response 322 includes the adapter hash 321.
5. The programming processor 218 and the programming cryptographic chip 412 extract the adapter identifier 306 by comparing the primary key hash 320 to the adapter hash 321. The adapter identifier 306 will only be correct if it was properly encoded and decoded using the same value of the primary key 414. For example, if the adapter identifier 306 decoded from the adapter hash 321 using the primary key 414 matches, then this one of the socket adapters 206 will be authenticated.

In a matching step 508, the primary key hash 320 will only match the adapter hash 321 only if the primary key 414 on the device programming system 201 of FIG. 2 and the unknown key of the socket adapters 206 match.

The matching step 508 can be performed in a variety of ways. For example, the programming processor 218 and the programming cryptographic chip 412 can compare the primary key hash 320 and the adapter hash 321 for authentication. In another example, the programming processor 218 and the programming cryptographic chip 412 can extract and compare the adapter identifier 321 from each of the hashes. In yet another example, the device programming system 201 can extract and compare other security values encoded within both the primary key hash 320 and the adapter hash 321.

The programming cryptographic chip 412 has special properties not to reveal the key, but use it only internally in the calculation of the primary key hash 320. For example, if the primary key hash 320 and the adapter hash 321 match, then the authentication token 420 of FIG. 4 is updated with the adapter identifier 306

It has been discovered that the above communication process increases security by inhibiting code breaking processes by not exposing the primary key 414. The primary key 414 never gets exposed outside of the cryptographic chip, so monitoring the bus does not allow anyone to detect the primary key 414.

It has been discovered that the above communication process prevents code breaking processes by calculating the primary key hash 320 while not exposing the primary key 414. The primary key 414 remains hidden in the programming processor 218 or the socket adapters 206, so the primary key 414 cannot be detected by hardware monitoring.

It has been discovered that configuring the socket adapters 206 with the adapter cryptographic chip 302 can increase security by preventing the programming of the programmable devices 212 of FIG. 2 that are not coupled to one of the socket adapters 206 that has been authenticated. Restricting the transfer of sensitive content or code to the programming devices 212 to only those mounted on authenticated ones of the socket adapters 206 reduces piracy and is an effective element of a comprehensive security system for programming programmable devices 212.

It has been discovered that configuring the socket adapters 206 with the adapter cryptographic chip 302 can increase process integrity by allowing the tracking of the socket adapters 206 using the adapter identifier 306. Logging the adapter identifier 306 as part of the manufacturing process provides a secure audit trail to document this portion of the manufacturing process down to the adapter and device level.

Figure 6:
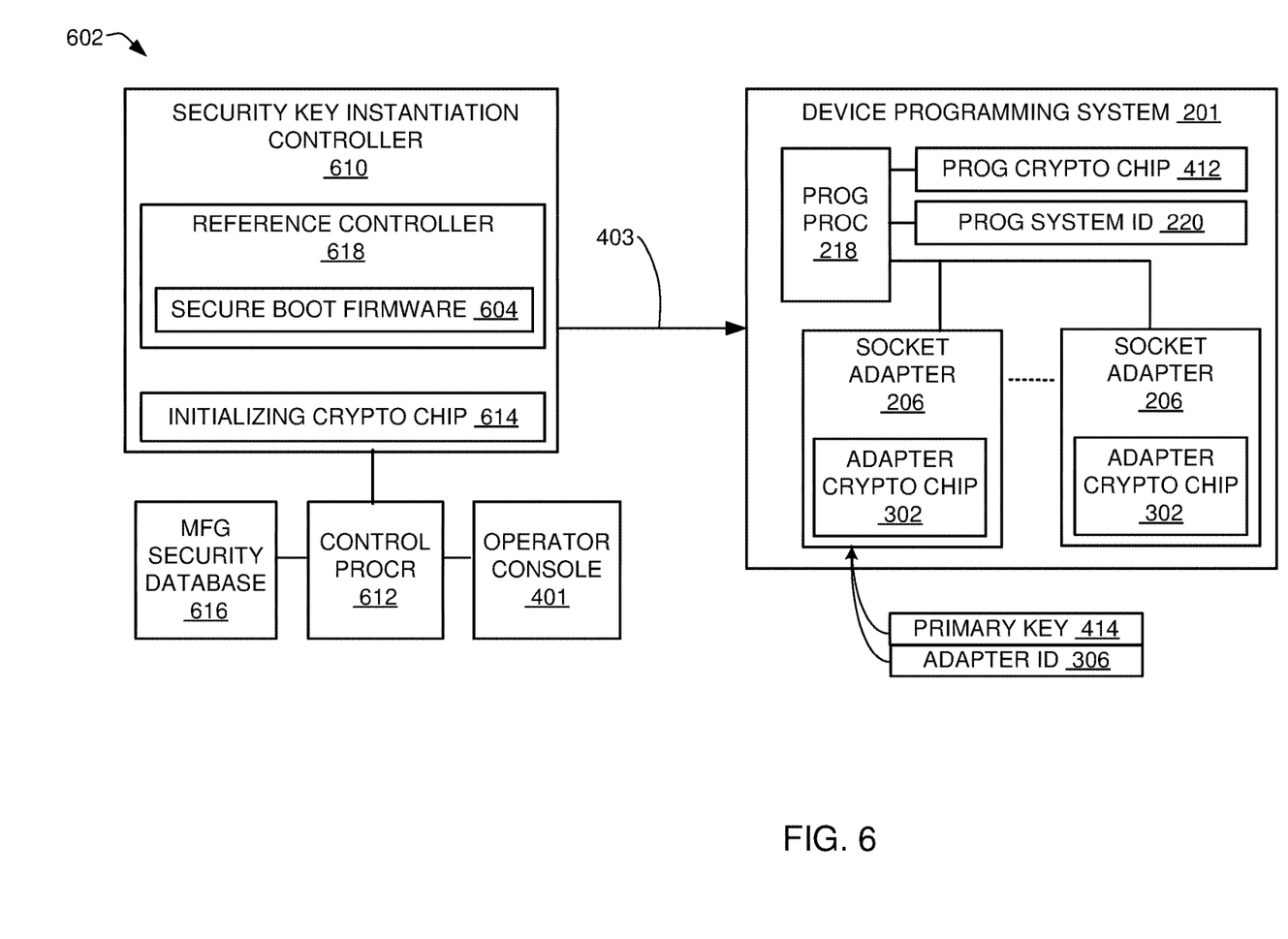
FIG. 6 is a functional block diagram of a security provisioning system.

Referring now to FIG. 6, therein is shown a functional block diagram of a security provisioning system 602. The security provisioning system 602 includes a security key instantiation controller 610 coupled to the device programming system 201.

The security key instantiation controller 610 can include a control processor 612, the operator console 401, a manufacturing security database 616, a reference controller 618, a secure bootstrap firmware 604, and an initializing cryptographic chip 614. The device programming system 201 can include the programming processor 218, the programming cryptographic chip 412, the programming system identifier 220, and one or more of the socket adapters 206. Each of the socket adapters 206 includes the adapter cryptographic chip 302. Each of the socket adapters 206 can include the adapter identifier 306. The security provisioning system 602 can provision the adapter cryptographic chip 302 and the programming cryptographic chip 412 with the primary key 414 over the secure network 403.

For example, the initializing cryptographic chip 614 can be from the Atmel family of crypto-authentication chips including the ATAES132A, the ATECC108A, the ATSHA204A, or the ATECC508A. The initializing cryptographic chip 614 can implement a variety of security models including the Advanced Encryption Standard (AES), Elliptical curve cryptography (ECC), Elliptic Curve Diffie-Hellman (ECDH), or a combination thereof.

The term cryptographic chip can include the adapter cryptographic chip 302, the programming cryptographic chip 412, or the initializing cryptographic chip 614. The adapter cryptographic chip 302, the programming cryptographic chip 412, or the initializing cryptographic chip 614 can be the same cryptographic chip type for proper interoperation between the cryptographic chips.

The security key instantiation controller 610 is used to transfer the primary key 414 to the programming cryptographic chip 412 in the automated assembly system 100 of FIG. 1 in a secure sequence. The security key instantiation controller 610 can selectively initialize the primary key 414 in the automated assembly system 100, the socket adapters 206, or the combination thereof.

The security key instantiation controller 610 can provision the device programming system 201 with the primary key 414 by initializing the primary key 414 in the programming cryptographic chip 412. The security key instantiation controller 610 can provision the socket adapters 206 with the primary key 414 by initializing the primary key 414 in the adapter cryptographic chip 302.

The manufacturer security database can be accessed by the control processor 612. The operator console 401 can initiate the key instantiation process. An operator can log into the operator console 401 after being authenticated on the operator console 401. An uninitiated one of the automated assembly system 100 having one or more of the socket adapters 206 that are uninitiated and can be coupled to the security key instantiation controller 610.

Figure 7:
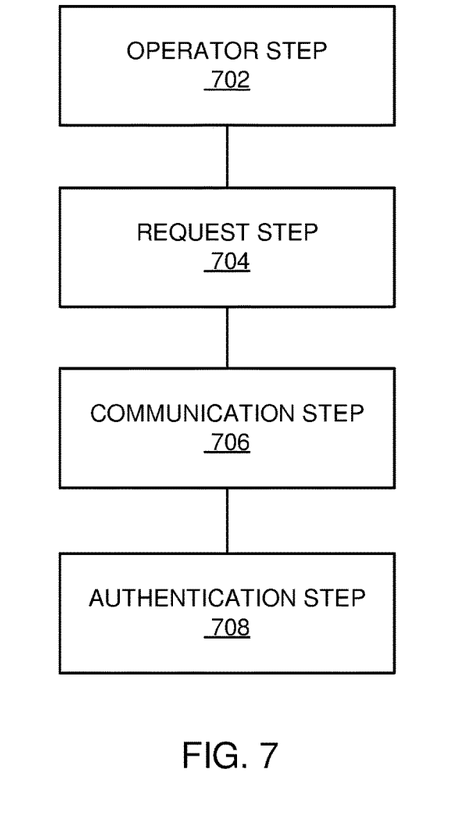
FIG. 7 is an exemplary process flow of the operation of the security provisioning system.

Referring now to FIG. 7, therein is shown an exemplary process flow of the operation of the security provisioning system 602 of FIG. 6. The security provisioning system 602 can initialize one of the automated assembly system 100 of FIG. 1. For example, the initialization process can provision the automated assembly system 100 by configuring the programming cryptographic chip 412 of FIG. 4 with a unique value of the primary key 414 of FIG. 4. Once the programming cryptographic chip 412 is configured with the primary key 414, the primary key 414 cannot be access from outside the programming cryptographic chip 412.

In another example, the security provisioning system 602 can configure the adapter cryptographic chip 302 of FIG. 3 of one of the socket adapters 206 of FIG. 2 attached to the device programming system 201 of FIG. 2. Configuring the adapter cryptographic chip 302 includes storing the primary key 414 in the adapter cryptographic chip 302.

In an operator step 702, the operator authenticates through the operator console 401 of FIG. 4, to the secure network 403 of FIG. 4 as the operator who is authorized to manufacture new boards. The manufacturing security database 616 of FIG. 6 is owned and managed by the intellectual property (IP) owner or and not the client factory. The manufacturing security database 616 records all the details of the provisioning activity.

In a request step 704, the operator is authenticated and the control processor 612 of FIG. 6 executing the factory software package requests the security key instantiation controller 610 of FIG. 6 to transfer the primary key 414 to the uninitiated one of the automated assembly system 100 or the uninitiated one of the socket adapters 206. The security key instantiation controller 610 can also be known as the golden controller.

In a communication step 706, the communication between the security key instantiation controller 610 and the automated assembly system 100 is session based using random numbers to uniquely identify the session and targeted between the initializing the adapter cryptographic chip 302 of FIG. 3 as identified by a specific one of the adapter identifier 306 of FIG. 3. Thus, the communication is protected from security breaches, such as replay attack or man-in-the middle attack.

In an authentication step 708, the programming cryptographic chip 412 of the uninitiated one of the automated assembly system 100 receives the primary key hash 320 of FIG. 3 communication and reads the adapter identifier 306, the primary key 414 is established and cannot be changed or accessed. Again, at no point in this process is the primary key 414 transferred through the communication.

The security key instantiation controller 610 is only initialized once. The generation of a master key 620 of FIG. 6 within the security key instantiation controller 610 is performed by the secure bootstrap firmware 604 of FIG. 6, which instructs the initializing cryptographic chip 614 of FIG. 6 to self-generate a random key and save it as the master key 620 that can only be used by the initializing cryptographic chip 614, but never made available for outside access. The master key 620 can be the primary key 414 of the programming cryptographic chip 412. Once this is done, the security key instantiation controller 610 becomes the reference controller 618 of FIG. 6, from which all of the automated assembly system 100 or the socket adapters 206 are spawned.

The security key instantiation controller 610 can encoded the programming system identifier 220 of FIG. 2 with the primary key 414 and send it to the device programming system 201. The programming cryptographic chip 412 can decode the primary key 414 using the programming system identifier 220 and store the received encoded version of the primary key 414 inside the programming cryptographic chip 412.

In another example, the security key instantiation controller 610 can encode the programming processor 218 of FIG. 2 can send the primary key 414 with both the programming system identifier 220 and adapter identifier 306 of one of the socket adapters 206 and send it to the device programming system 201. The programming process 218 and the programming cryptographic chip 412 can send the encrypted value to the appropriate one of the socket adapters 206 which can then use the adapter cryptographic chip 302 to decode the primary key 414 internally using the adapter identifier 306 and the programming system identifier 220. The primary key 414 is then stored internally within the adapter cryptographic chip 302 and not made accessible from outside the adapter cryptographic chip 302.

It has been discovered that the security provisioning system 602 can self-generate and instantiate the master key 620 in the automated assembly system 100, the socket adapters 206, or the combination thereof. The process of instantiating the master key 620 in the automated assembly system 100 or the socket adapters 206, never exposes the master key 620 to the outside of the initializing cryptographic chip 614 by keeping the primary key 414 in hardware so it can never be seen but only can be used cryptographically to authenticate other devices, using latest hardware capabilities in a novel way.

It has been discovered that provisioning the device programming system 201 with the primary key 414 via the secure network 403 of FIG. 4 improves the level of security of the device programming system 201 of FIG. 2 by enabling the authentication of the socket adapters 206. By matching the primary key hash 320 and the adapter hash 321 of FIG. 3, the device programming system 201 can insure that the correct ones of the socket adapters 206 are being used during operation.

It has been discovered that provisioning the socket adapters 206 with the primary key 414 via the secure network 403 improves the level of security of the device programming system 201 by enabling the authentication of the socket adapters 206. By calculating the adapter hash 321 based on the primary key 414 and the adapter identifier 306, the device programming system 201 can insure that the correct ones of the socket adapters 206 are being used during operation.

It has been discovered that provisioning the socket adapters 206 with the primary key 414 encrypted using the programming system identifier 220 and the adapter identifier 302 improves the level of security of the device programming system 201 by enabling the authentication of the socket adapters 206 and keeping the primary key 414 hidden from view. By decrypting the primary key 414 using the programming system identifier 220 and the adapter identifier 306, the device programming system 201 can insure that the correct ones of the socket adapters 206 are being used during operation.

Figure 8:
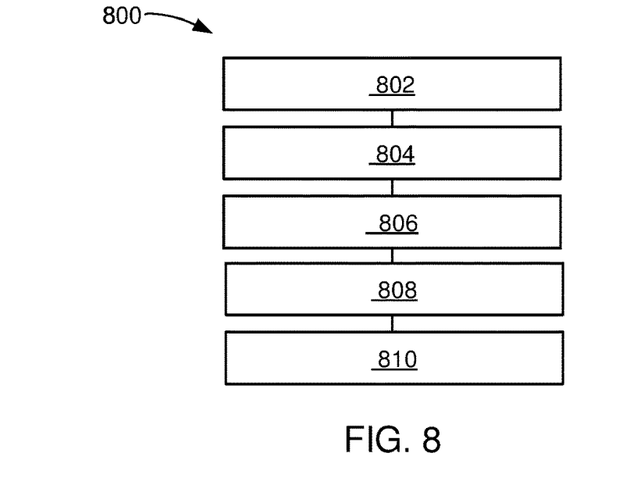
FIG. 8 is a flow chart of an automated manufacturing system for operating the automated manufacturing system in accordance with an alternative embodiment of the present invention.

Referring now to FIG. 8, therein is shown a flow chart for an automated manufacturing system 800 for operating the automated manufacturing system 800 in accordance with an alternative embodiment of the present invention. The automated manufacturing system 800 includes detecting a socket adapter having an adapter identifier and an adapter cryptographic chip in a block 802; calculating a primary key hash based on a primary key in a programming cryptographic chip in a block 804; calculating an adapter hash based on the adapter identifier using the adapter cryptographic chip in a block 806; matching the primary key hash to the adapter hash to update an authentication token with the adapter identifier for authenticating the socket adapter on the device programming system in a block 808; and programming programmable devices in the socket adapter based on the authentication token in a block 810.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

The resulting processes and configurations are straightforward, cost-effective, uncomplicated, highly versatile and effective, can be surprisingly and unobviously implemented by adapting known technologies, and are thus readily suited for efficiently and economically configuring programmable devices fully compatible with conventional manufacturing processes and technologies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the scope of the included claims. All matters hithertofore set forth herein or shown in the accompanying drawings are to be interpreted in an illustrative and non-limiting sense.

What is claimed is:

1. A method of operation of a security provisioning system comprising:
   calculating an adapter digital signature based on an adapter identifier associated with a socket adapter using an adapter cryptographic chip in communication with the socket adapter;
   calculating a programmer digital signature based on the adapter identifier using a programming cryptographic chip of a device programming system;
   authenticating the socket adapter by matching the adapter digital signature to the programmer digital signature; and
   programming programmable devices in the socket adapter upon authentication of the socket adapter.

2. The method as claimed in claim 1 wherein calculating the adapter digital signature includes calculating the adapter digital signature based on the adapter identifier and a primary key.

3. The method as claimed in claim 1 wherein the calculating the programmer digital signature includes calculating the programmer digital signature using a primary key and the adapter identifier retrieved from the socket adapter.

4. The method as claimed in claim 1 wherein authenticating the socket adapter includes comparing an adapter hash generated by the adapter cryptographic chip to a primary key hash generated by the programming cryptographic chip.

5. The method as claimed in claim 1 further comprising preventing the programming of the programmable devices upon the failure of the authentication of the socket adapter.

6. A method of operation of a security provisioning system comprising:
storing a primary key inside an adapter cryptographic chip and a programming cryptographic chip;
calculating an adapter digital signature based on an adapter identifier and the primary key using the adapter cryptographic chip on a socket adapter;
calculating a programmer digital signature based on the adapter identifier and the primary key using the programming cryptographic chip of a device programming system;
authenticating the socket adapter by matching the adapter digital signature to the programmer digital signature; and
programming programmable devices in the socket adapter upon authentication of the socket adapter.

7. The method as claimed in claim 6 wherein calculating the adapter digital signature includes calculating the adapter digital signature using an advanced encryption standard method, an elliptical curve method, or a combination thereof.

8. The method as claimed in claim 6 wherein programming the programmable devices includes programming the programmable devices in a destination socket of the socket adapter.

9. The method as claimed in claim 6 wherein storing the primary key includes receiving the primary key from a security key instantiation controller over a secure network.

10. The method as claimed in claim 6 wherein storing the primary key includes transferring the primary key from a security key instantiation controller to the programming cryptographic chip.

11. A security provisioning system comprising:
a socket adapter having an adapter identifier;
an adapter cryptographic chip on the socket adapter, configured to calculate an adapter digital signature based on the adapter identifier;
a programming cryptographic chip in a device programming system, coupled to the socket adapter, configured to calculate a programmer digital signature based on the adapter identifier; and
a programming processor, coupled to the device programming system, configured to authenticate the socket adapter by matching the adapter digital signature to the programmer digital signature and programming programmable devices in the socket adapter upon authentication of the socket adapter.

12. The system as claimed in claim 11 wherein the adapter digital signature is based on the adapter identifier and a primary key retrieved from the adapter cryptographic chip.

13. The system as claimed in claim 11 wherein the programmer digital signature is calculated using a primary key and the adapter identifier retrieved from the socket adapter.

14. The system as claimed in claim 11 wherein the adapter digital signature is an adapter hash.

15. The system as claimed in claim 11 wherein the programming processor is configured to prevent the programming of the programmable devices upon the failure of the authentication of the socket adapter.

16. The system as claimed in claim 11 further comprising a primary key securely stored inside the adapter cryptographic chip and the programming cryptographic chip.

17. The system as claimed in claim 16 wherein the adapter digital signature is calculated using an advanced encryption standard system, an elliptical curve system, or a combination thereof.

18. The system as claimed in claim 16 wherein the socket adapter includes a destination socket configured to hold and program the programmable devices.

19. The system as claimed in claim 16 further comprising a secure network configured to transfer the primary key from a security key instantiation controller to the device programming system.

20. The system as claimed in claim 16 further comprising a security key instantiation controller transferring the primary key to the programming cryptographic chip.

* * * * *